United States Patent
Tarasow et al.

(10) Patent No.: US 12,253,595 B2
(45) Date of Patent: Mar. 18, 2025

(54) DETECTING AND DETERMINING RELEVANT VARIABLES OF AN OBJECT BY MEANS OF ULTRASONIC SENSORS

(71) Applicant: Volkswagen Aktiengesellschaft, Wolfsburg (DE)

(72) Inventors: Alex Tarasow, Braunschweig (DE); Daniel Gohlke, Wasbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 164 days.

(21) Appl. No.: 18/253,119

(22) PCT Filed: Oct. 13, 2021

(86) PCT No.: PCT/EP2021/078237
§ 371 (c)(1),
(2) Date: May 16, 2023

(87) PCT Pub. No.: WO2022/106124
PCT Pub. Date: May 27, 2022

(65) Prior Publication Data
US 2024/0036193 A1    Feb. 1, 2024

(30) Foreign Application Priority Data

Nov. 20, 2020   (DE) ..................... 10 2020 214 619.5
Apr. 8, 2021    (DE) ..................... 10 2021 203 497.7

(51) Int. Cl.
*G01S 15/08*    (2006.01)
*G01S 7/539*    (2006.01)
(Continued)

(52) U.S. Cl.
CPC .............. *G01S 15/08* (2013.01); *G01S 7/539* (2013.01); *G01S 15/588* (2013.01); *G01S 15/931* (2013.01)

(58) Field of Classification Search
CPC ...... G01S 15/588; G01S 15/08; G01S 15/931; G01S 7/539
(Continued)

(56) References Cited

U.S. PATENT DOCUMENTS

| | | | |
|---|---|---|---|
| 7,843,767 B2 * | 11/2010 | Hayasaka | ........... G01S 7/52004 367/99 |
| 2008/0232198 A1 * | 9/2008 | Hayasaka | ........... G01S 7/52004 367/99 |

(Continued)

FOREIGN PATENT DOCUMENTS

| | | | | |
|---|---|---|---|---|
| DE | 102006036423 A1 | 2/2008 | ............... | B60Q 9/00 |
| DE | 102015117379 A1 | 4/2017 | ............ | B60W 30/06 |

(Continued)

OTHER PUBLICATIONS

Yu, Jiaying et al., "Dynamical Tracking of Surrounding Objects for Road Vehicles Using Linearly-Arrayed Ultrasonic Sensors," IEEE Intelligent Vehicles Symposium (IV), pp. 72-77, Jun. 19, 2016.

(Continued)

*Primary Examiner* — Daniel L Murphy
*Assistant Examiner* — Amie M Ndure
(74) *Attorney, Agent, or Firm* — Slayden Grubert Beard PLLC

(57) ABSTRACT

The disclosure relates to a method and a device for determining relevant variables of an object in the environment of a motor vehicle by means of at least one ultrasonic, the method comprising: acquiring a measurement series of real sensor values for the at least one ultrasonic sensor, which sensor values represent the shortest distance between the (Continued)

object and the motor vehicle, wherein the sensor values are acquired cyclically with a specified time interval, modeling a series of sensor values for the at least one ultrasonic sensor by modeling the object movement using a state vector and a parameter vector, and modeling the distance sensing in accordance with the state vector and the parameter vector, and determining the state vector and the parameter vector by adapting the modeled sensor values to the measured real sensor values of the at least one ultrasonic sensor by means of an optimization method.

17 Claims, 9 Drawing Sheets

(51) Int. Cl.
  *G01S 15/58* (2006.01)
  *G01S 15/931* (2020.01)
(58) Field of Classification Search
  USPC .......... 367/99, 104, 96, 909, 88; 342/70, 71; 340/903; 701/301, 36, 41
  See application file for complete search history.

(56) References Cited

U.S. PATENT DOCUMENTS

2022/0342061 A1* 10/2022 Pampus ................. G01S 15/46
2023/0305112 A1*  9/2023 Podolski ............... G01S 17/931

FOREIGN PATENT DOCUMENTS

| DE | 102018105014 A1 | 9/2018  | ......... B60R 21/0134 |
| DE | 102021203497 A1 | 5/2022  | ........... G01S 15/931 |
| WO | 2013/180787 A1  | 12/2013 | ............ B60W 10/00 |
| WO | 2016/189112 A1  | 12/2016 | .......... B60W 30/095 |
| WO | 2022/106124 A1  | 5/2022  | ............. G01S 15/08 |

OTHER PUBLICATIONS

International Search Report and Written Opinion, Application No. PCT/EP2021/078237, 28 pages, Jan. 21, 2022.

* cited by examiner

US 12,253,595 B2

DETECTING AND DETERMINING RELEVANT VARIABLES OF AN OBJECT BY MEANS OF ULTRASONIC SENSORS

CROSS-REFERENCE TO RELATED APPLICATIONS

This application claims priority to German Patent Application No. 10 2020 214 619.5, filed on Nov. 20, 2020 with the German Patent and Trademark Office and to German Patent Application No. 10 2021 203 497.7, filed on Apr. 8, 2021 with the German Patent and Trademark Office. The contents of the aforesaid patent applications are incorporated herein for all purposes.

TECHNICAL FIELD

The invention relates to a method for detecting and tracking an object in the environment of a motor vehicle by means of ultrasound, and to a corresponding device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In order to control a vehicle, referred to in the following as an ego vehicle, in an automated or, alternatively, semi-automated manner, objects in the environment of the ego vehicle need to be detected. First and foremost, the physical variables such as position, orientation, speed, and dimensions of these objects, which may be both static and dynamic, are relevant here. Detecting objects in the environment of the ego vehicle using ultrasonic sensors constitutes an alternative to radar- or camera-based detection. Furthermore, it can be used as a redundant source of information, for example in order to achieve a particular ASIL level.

However, the prior art does not contain precise information regarding the technical implementation of how to detect objects using ultrasonic sensors. Neither are there any explanations as to how a distance value estimated using a Kalman filter as well as the first and second derivations of said value can be used to determine the relevant object variables actually of interest for objects in the environment of the ego vehicle, namely the position, orientation, speed and dimensions of the object.

SUMMARY

A need exists to improve the detection of an object and of its relevant object variables in the environment of a motor vehicle, referred to in the following as ego vehicle, by means of ultrasound.

The need is addressed by a method for detecting an object in the environment of an ego vehicle and by a corresponding device according to the independent claims. Embodiments of the invention are described in the dependent claims, the following description, and the drawings.

DESCRIPTION

Figure 1:
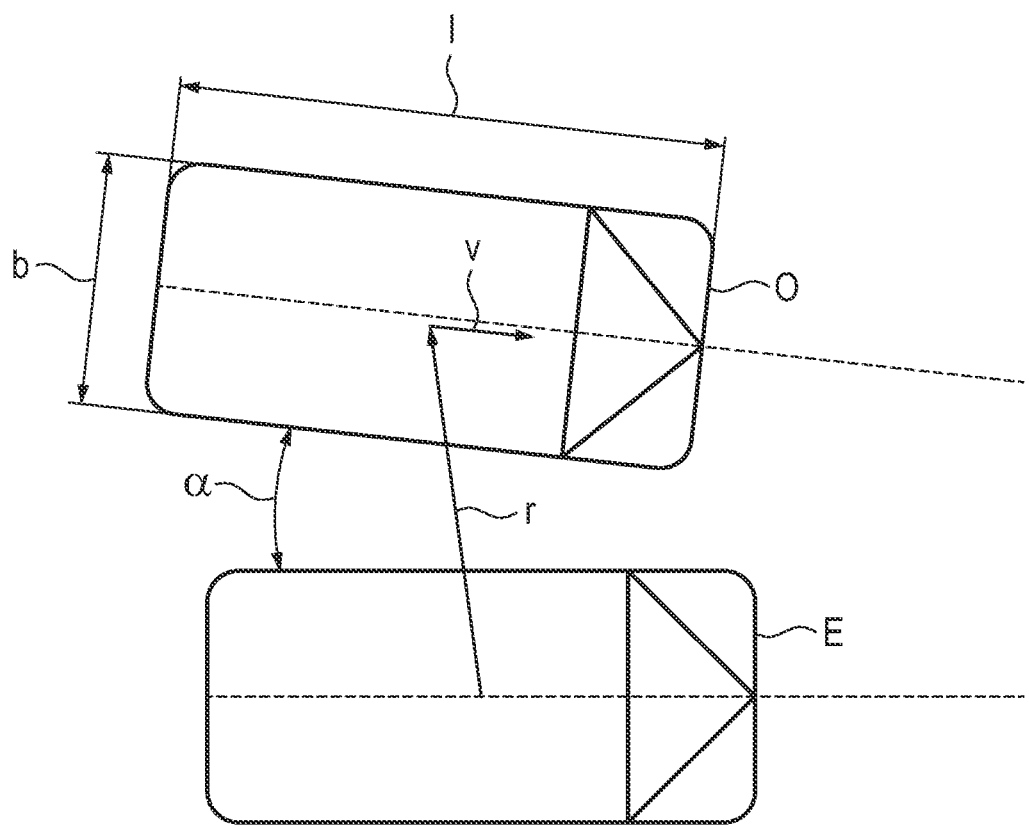
FIG. 1 shows a definition of relevant reference variables.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for detecting and determining relevant variables of an object in the environment of a motor vehicle by means of at least one ultrasonic sensor disposed laterally on the motor vehicle is provided. The ultrasonic sensor may have a sensing range defined by a sensor-specific opening angle, and the method may comprise the steps of:

acquiring a measurement series of real sensor values for the at least one ultrasonic sensor, which sensor values represent the shortest distance between the object and the motor vehicle, wherein the sensor values are acquired cyclically with a specified time interval, modeling a series of sensor values for the at least one ultrasonic sensor by
modeling the object movement using a state vector and a parameter vector, wherein the state vector and parameter vector are calculated from the relevant object variables,
modeling the distance sensing in accordance with the state vector and the parameter vector, and
determining the state vector and the parameter vector by adapting the modeled sensor values to the measured real sensor values of the at least one ultrasonic sensor by means of an optimization method.

In this way, the relevant object variables, such as the position, orientation, speed and dimensions of the object, can be acquired in a model-based manner and thus in a closed, consistent form. The predictive error method, a sliding mode observer, the Kalman filter, or the Levenberg-Marquardt method can be considered as a suitable optimization method, such that the deviation between the modeled and real recorded sensor values is as small as possible.

For example, the sum of the differences between the modeled sensor values and the real sensor values is minimized in order to determine the state vector and parameter vector.

For example, a modeled sensor value vector is formed from the modeled values of the at least one ultrasonic sensor, which modeled sensor value vector is linked to the sensor value vector of the real sensor values of the individual ultrasonic vectors for minimization.

For example, the modeled sensor values are a function of the position of the object relative to the ego vehicle and a function of the appearance of corners of the object within the sensing range of the at least one ultrasonic sensor, wherein the coordinates of the corners of the object are determined in the coordinate system of the motor vehicle.

For example, the relevant variables of the object are given at least by:
the longitudinal distance of the object from the motor vehicle,
the longitudinal speed of the object relative to the motor vehicle,
the lateral distance of the object from the motor vehicle,
the lateral speed of the object relative to the motor vehicle,
the angle between the longitudinal axis of the object and the longitudinal axis of the motor vehicle,
the length of the object, and
the width of the object.

For example, the modeled sensor value vector is formed from the modeled distance values of the at least one ultrasonic sensor, wherein the modeled distance value of the at least one ultrasonic sensor results from the minimum of the maximum range of the at least one ultrasonic sensor and calculated distance values between the object and the motor vehicle.

For example, the calculated distance values are ascertained as a function of the position of the object relative to the sensor normal of the at least one ultrasonic sensor of the motor vehicle, wherein the sensor normal is defined as the straight line that extends through the origin of the respective at least one ultrasonic sensor and that stands perpendicularly on the object longitudinal axis.

For example, in order to determine the calculated distance values, it is checked whether the object is located to the left or right of or on the sensor normal.

Furthermore, the check of the position of the object can be carried out by means of activation functions.

A device for detecting, tracking and determining relevant variables of an object in the environment of a motor vehicle is provided in some embodiments, wherein the device is configured and designed to carry out the previously described method, and comprises
at least one ultrasonic sensor disposed laterally on the motor vehicle for cyclically determining sensor values that represent distances from an object,
an apparatus for determining modeled sensor values as a function of relevant variables of the object, and
an optimization apparatus for adapting the modeled sensor values to the real sensor values for each ultrasonic sensor for acquiring the relevant object variables.

Further embodiments are discussed in greater detail with reference to the drawings.

Specific references to components, process steps, and other elements are not intended to be limiting. Further, it is understood that like parts bear the same or similar reference numerals when referring to alternate FIGS.

FIG. 1 shows the definition of the relevant object variables in the case of an object O being detected in the environment of an ego vehicle, wherein no road boundaries or markings are shown in the image for the sake of simplicity. The schematic FIG. 1 shows an ego vehicle E that is moving in the direction of the triangle drawn in the ego vehicle E. An object O that is moving at an angle α relative to the ego vehicle is located above the ego vehicle, wherein the travel direction of the object is given by the triangle drawn in the object. The angle α shown in FIG. 1 between the sides of the two vehicles, the ego vehicle E and the object, is defined by the angle enclosed between the two longitudinal axes of the vehicles (not shown).

The object O is further characterized by its length l and width b as well as by its position $\vec{r}$ relative to the ego vehicle E, wherein the following applies for the position $\vec{r}$ in the $x_e$-$y_e$ coordinate system of the ego vehicle:

$$\vec{r} = [x,y]^T,$$

wherein the position vector $\vec{r}$ is applied to the geometric centers of gravity of the vehicles E and O.

Furthermore, the object O is moving at a speed $\vec{v}$ relative to the ego vehicle, wherein the following applies for the speed $\vec{v}$ relative to the ego vehicle E:

$$\vec{v} = [v_x, v_y]^T,$$

wherein $v_x$ and $v_y$ are defined in the $x_e$-$y_e$ coordinate system of the ego vehicle E.

In order to be able to model the movement of the object O, state variable $x_1$ to $x_6$ are defined, which are combined into one state vector $$\vec{x} = [x_1, x_2, x_3, x_4, x_5, x_6]^T$$

The meaning of the individual state variables is as follows:
$x_1$: Longitudinal object position,
$x_2$: Longitudinal object speed,
$x_3$: Lateral object position,
$x_4$: Lateral object speed,
$x_5$: Angle between the longitudinal axes of the ego vehicle and object, and
$x_6$: Temporal change in the angle between the longitudinal axes of the vehicles.

The replication of the movement of the object O can be expressed as follows:

$$\vec{x}(k+1) = A \cdot \vec{x}(k) + K(k) \cdot \vec{e}(k), \text{ wherein } k \in 1, \ldots N, \text{ with}$$
N=number of measurements, and with the matrix A defined as follows, wherein T represents the sampling time between two measurements:

$$A = \begin{bmatrix} 1 & T & 0 & 0 & 0 & 0 \\ 0 & 1 & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 \end{bmatrix}.$$

Here, K(k) is the matrix yet to be determined for correcting the estimation via the feedback of the error vector $\vec{e}(k)$. The error vector $\vec{e}(k)$ contains the deviations between the modeled values $\hat{y}_i(k)$ and the measured values $y_i(k)$ of the various sensors i=1 to m, wherein the components of the vector $\vec{e}(k)$ are defined as follows:

$$e_i(k) = y_i(k) - \hat{y}_i(k), \text{ with}$$

$$y_i = h_i(\vec{x}(k), \vec{\theta}(k)).$$

Here, $h_i$ is the so-called output function and describes the distance sensing with the sensor i as a function of $\vec{x}$ and the parameter vector $\vec{\theta}$, wherein the parameter vector $\vec{\theta}$ contains the unknown width and length of the object as well as the coefficients of the matrix K and is estimated using a suitable optimization method.

Figure 2A:
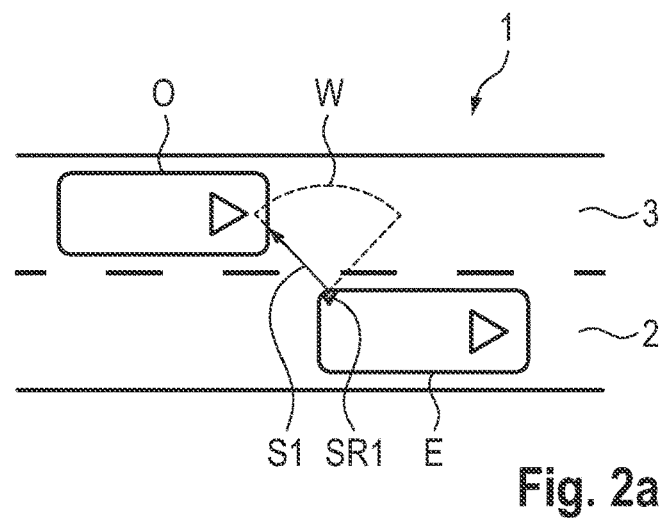
FIG. 2a shows a first situation of distance sensing.
Figure 2B:
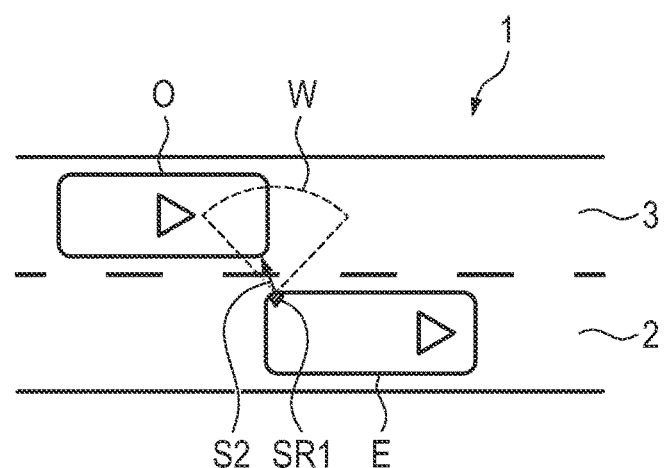
FIG. 2b shows a second situation of distance recognition.
Figure 2C:
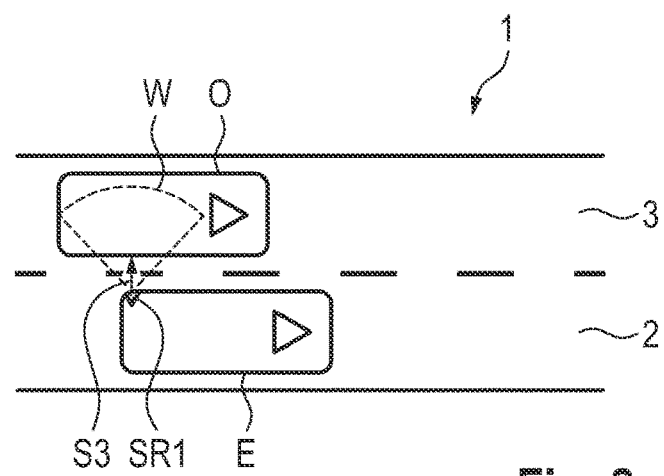
FIG. 2c shows a third situation of distance recognition.

FIGS. 2a to 2b portray the three possible situations of the sensing of the distance between an ego vehicle E and an adjacent vehicle, i.e., an object O, by means of an ultrasonic sensor SR1. Here, the replication or modeling of the distance sensing with an ultrasonic sensor plays an important role, since this influences not only the complexity of the algorithm, but also the identifiability of unknown parameters such as the object length, and the observability of unmeasurable object variables, such as the position, speed and/or angle. Since an ultrasonic sensor only provides the shortest distance from the object, the information content of the distance measurement and also the modeling thereof differs depending on whether or not the object O to be detected completely covers the sensing range of the sensor SR1, as shown in FIGS. 2a to 2c. For simplification purposes, only one sensor SR1 is shown in the ego vehicle E, which sensor is laterally disposed to the left in the rear region of the ego vehicle, wherein the shown SR1 shown has a sensing range W within which detection of an object O is possible. Furthermore, the travel direction of the two vehicle O, E is indicated by means of the triangle in the respective vehicles O, E.

FIG. 2a shows the situation in which the vehicle or rather object O is approaching the ego vehicle E from behind on the outside lane 3 of a roadway 1, the ego vehicle being located on the inside lane 2 of the roadway 1. The sensor SR1 of the ego vehicle E detects a distance s1 to the front of the object vehicle O within its sensing range W, wherein the sensor S always provides the shortest distance to the object O.

FIG. 2b shows the situation in which the vehicle O on the outside lane 3 has caught up more with the ego vehicle E than in the situation in FIG. 2a. The sensor SR1 then measures the distance s2 as the shortest distance to the object vehicle O within the sensing range W.

In FIG. 2c, the object vehicle O has moved up to the side next to the ego vehicle E, and therefore the sensor SR1 now ascertains a distance s3 as the shortest distance.

It is obvious from the sequence of the approach of the object vehicle O to the ego vehicle E that, in FIG. 2a, firstly the distance s1 to the front of the object vehicle O is ascertained, in FIG. 2b the distance s2 to the front corner of the object vehicle is ascertained in another approximation, and finally, in FIG. 2c, the lateral distance s3 to the object vehicle O is ascertained, a follows:

$$s1 > s2 > s3.$$

In the case of the measurements shown in FIGS. 2a to 2c, these measurements s1, s2 and s3 are therefore components of the measurement vector $y_{SR1}(k)$ of the sensor SR1 with k∈1, ... N, N=number of measurements.

Figure 3:
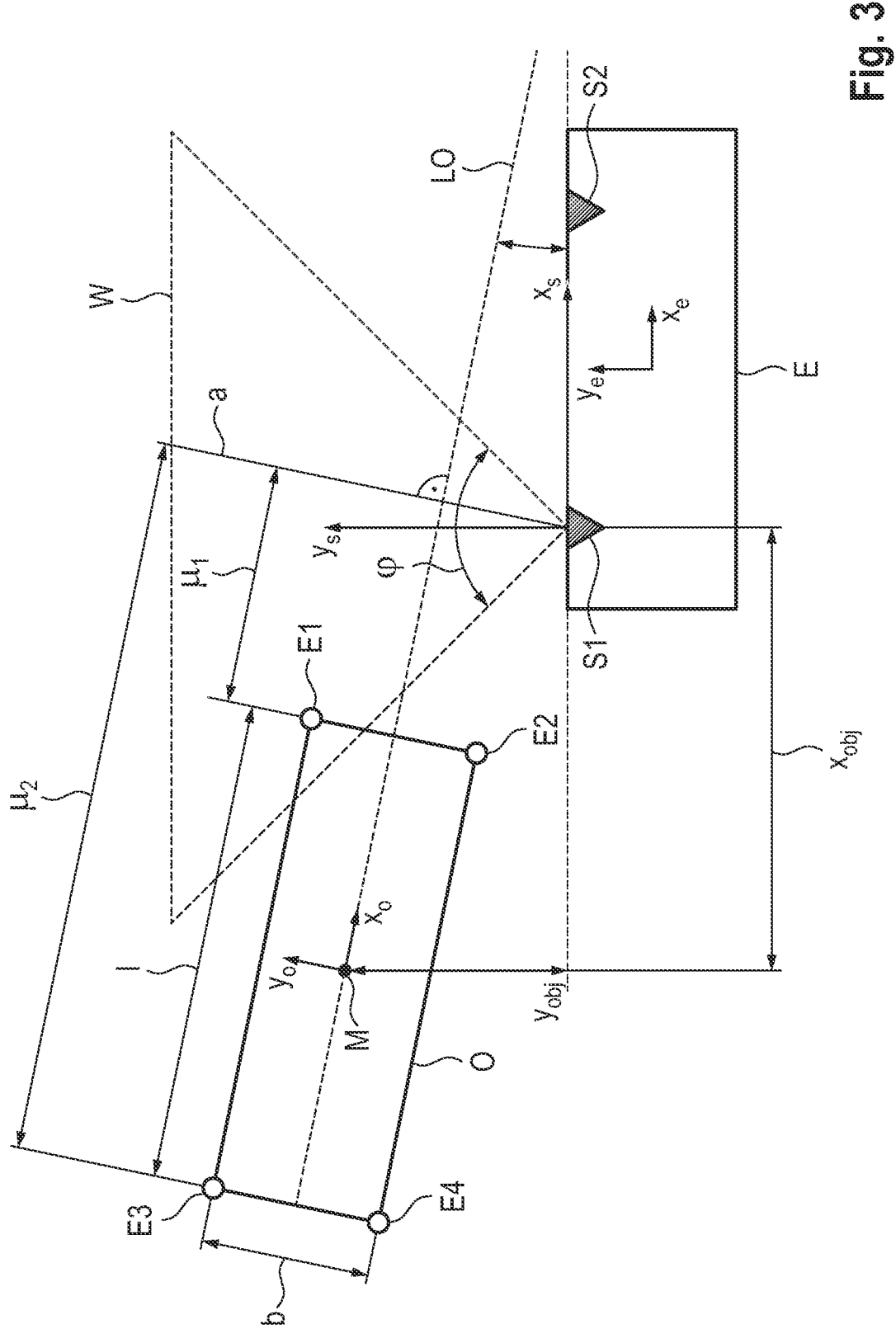
FIG. 3 shows a modeling of the distance sensing.

FIG. 3 shows the modeling of the distance sensing of the sensed object O with respect to the ego vehicle E, i.e. the modeling of the circumstances shown in FIGS. 2a to 2c. Here, the object O is moving along its longitudinal axis to the right and the ego vehicle E is moving along its longitudinal axis to the right as well, wherein the two directions of movement enclose an angle α. The ego vehicle E is shown with two sensors SR1 and Sr2 laterally disposed on its left-hand side, wherein only the back left sensor SR1 is considered in this discussion.

The coordinate system $x_e, y_e$ of the ego vehicle E is located in the center thereof and the zero point of the coordinate system $x_S, y_S$ of the sensor SR1 considered here is disposed centrally in the transmission plane of the sensor SR1. The coordinate system of the sensor SR1 is transformed into the coordinate system of the ego vehicle E by adding up the coordinates of the installation position of the sensor SR1.

The reference signs E1 to E4 denote the corners of the object O as drawn, wherein E1 forms the front left corner, E2 forms the front right corner, E3 forms the back left corner, and E4 forms the back right corner of the object. Consequently, the connection E1E2 forms the front edge and the connection E3E4 forms the back edge of the object, wherein the width of the object O is denoted by b and the length is denoted by l.

Furthermore, the sensing range W of the sensor SR1 is shown and is defined by an opening angle φ. The perpendicular a to the longitudinal axis LO of the object is drawn in the coordinate origin of the sensor SR1 and serves to define and determine the distances $\mu_1$ and $\mu_2$ and is referred to as the sensor normal. Here, the distance $\mu_1$ is defined as the distance between the front edge E1E2 and the perpendicular a and the distance $\mu_2$ is defined as the distance between the back edge E3E4 of the object O and the perpendicular a. Finally, the center point M of the object O in the $x_S, y_S$ coordinate system of the sensor SR1 has the coordinates $x_{obj}$ and $y_{obj}$.

Furthermore, the following applies for the above-defined state variable $\vec{x} = [x_1, x_2, x_3, x_4, x_5, x_6]^T$:

$$x_{obj} = x_1(k)$$

$$y_{obj} = x_3(k)$$

$$\alpha = x_5(k),$$

$$\theta_1 = 0.5 \cdot l, \text{ and}$$

$$\theta_2 = 0.5 \cdot b.$$

The calculation steps for determining the distance value of a sensor, in this case the sensor SR1, are thus the following:

Firstly, the distances $\mu_1$ and $\mu_2$ are determined, wherein the straight line a referred to as the sensor normal is being shown in the Hess normal form and the distances $\mu_1$ and $\mu_2$ are calculated as orthogonal distances between the two corner points E1 and E3 as well as the straight line. The following equations then result:

$$\mu_1(k) = \cos x_5(k) \cdot x_{E1}(k) + \sin x_5(k) \cdot y_{E1}(k), \text{ and}$$

$$\mu_2(k) = \cos x_5(k) \cdot x_{E3}(k) + \sin x_5(k) \cdot y_{E3}(k).$$

The coordinates of the corners E1 and E4 of the object O in the coordinate system $x_e, y_e$ of the ego vehicle E are as follows:

$$x_{E1}(k) = x_1(k) + \theta_1(k) \cdot \cos x_5(k) + \theta_2 \cdot \sin x_5(k)$$

$$y_{E1}(k) = x_3(k) + \theta_1(k) \cdot \sin x_5(k) + \theta_2 \cdot \cos x_5(k) \qquad \text{E1:}$$

$$x_{E2}(k) = x_1(k) + \theta_1(k) \cdot \cos x_5(k) + \theta_2 \cdot \sin x_5(k)$$

$$y_{E2}(k) = x_3(k) + \theta_1(k) \cdot \sin x_5(k) + \theta_2 \cdot \cos x_5(k) \qquad \text{E2:}$$

$$x_{E3}(k) = x_1(k) + \theta_1(k) \cdot \cos x_5(k) + \theta_2 \cdot \sin x_5(k)$$

$$y_{E3}(k)=x_3(k)+\theta_1(k)\cdot\sin x_5(k)+\theta_2\cdot\cos x_5(k) \qquad \text{E3:}$$

$$x_{E4}(k)=x_1(k)+\theta_1(k)\cdot\cos x_5(k)+\theta_2\cdot\sin x_5(k)$$

$$y_{E4}(k)=x_3(k)+\theta_1(k)\cdot\sin x_5(k)+\theta_2\cdot\cos x_5(k) \qquad \text{E4:}$$

Here, the coordinates are transformed from the object coordinate system $x_O, y_O$ into the ego coordinate system $x_e, y_e$ using the following transformation matrix:

$$T = \begin{bmatrix} \cos x_5(k) & -\sin x_5(k) & x_1(k) \\ \sin x_5(k) & \cos x_5(k) & x_3(k) \end{bmatrix}.$$

The coordinates of the corner points E1, E2, E3, E4 in the object coordinate system $x_O, y_O$ are:

$$\begin{bmatrix} \frac{l}{2} \\ \frac{b}{2} \end{bmatrix}, \begin{bmatrix} \frac{l}{2} \\ -\frac{b}{2} \end{bmatrix}, \begin{bmatrix} -\frac{l}{2} \\ \frac{b}{2} \end{bmatrix} \text{ and } \begin{bmatrix} -\frac{l}{2} \\ -\frac{b}{2} \end{bmatrix}.$$

Consequently, the object corners are calculated in the ego coordinate system $x_e, y_e$ as follows:

$$E1 = T \cdot \begin{bmatrix} \frac{l}{2} \\ \frac{b}{2} \\ 1 \end{bmatrix}, E2 = T \cdot \begin{bmatrix} \frac{l}{2} \\ -\frac{b}{2} \\ 1 \end{bmatrix}, E3 = T \cdot \begin{bmatrix} -\frac{l}{2} \\ \frac{b}{2} \\ 1 \end{bmatrix} \text{ and } E4 = T \cdot \begin{bmatrix} -\frac{l}{2} \\ -\frac{b}{2} \\ 1 \end{bmatrix}.$$

Performing the transformations leads to the above results for the corners E1, E2, E3 and E4.

Subsequently, the modeled or estimated distance value $\hat{y}(k)$ of a sensor, in this case the sensor SR1 in the example of FIG. 3, is determined. For this purpose, the following three cases, which correspond to the situations of FIGS. 2a to 2c, are distinguished:

A(k): The case with $\mu_1(k)<0$ is considered. Here, the object O is located to the left of the straight line a, which extends through the origin of the coordinate system of the sensor SR1 and which is perpendicular to the longitudinal axis LO of the object, as already defined above. Here, three subcases are distinguished once more.

A1) If the following logic operation is satisfied:

$$\left(\cos\frac{\varphi}{2} \cdot x_{E1}(k) + \sin\frac{\varphi}{2} \cdot y_{E1}(k) \geq 0\right) \text{ AND}$$

$$\left(\cos\frac{\varphi}{2} \cdot x_{E2} + \sin\frac{\varphi}{2} \cdot y_{E2}(k) \leq 0\right)$$

this means that only the corner E1 is located within the sensing range W of the sensor SR1, and the distance s between the object O and the ego vehicle E is calculated as follows:

$$s = \frac{\mu_1(k)}{\sin\left(-\frac{\varphi}{2} - x_5(k)\right)},$$

wherein s denotes the shortest distance to the object O.

A2) If the condition:

$$\left(\cos\frac{\varphi}{2} \cdot x_{E2}(k) + \sin\frac{\varphi}{2} \cdot y_{E2}(k) \geq 0\right)$$

applies, which means that the corner E2 is located within the sensing range W of the sensor SR1, then s is calculated as follows:

$$s=\sqrt{x_{E2}(k)^2+y_{E2}(k)^2}.$$

A3) If neither the corner E1 nor the corner E2 is within the sensing range W of the sensor SR1 under the condition $\mu_1(k)<0$, the following applies:

$$s=s_{max},$$

wherein $s_{max}$ denotes the maximum range of the sensor SR1.

B(k): The case $\mu_2(k)>0$ will now be considered, which means that the object O is located to the right of the straight line a shown in FIG. 3.

B1) If the following condition is met:

$$\left(\cos\frac{\varphi}{2} \cdot x_{E4}(k) + \sin-\frac{\varphi}{2} \cdot y_{E4}(k) \leq 0\right),$$

which means that the corner E4 is located within the sensing range W of the sensor SR1, then the distance s of the object O is calculated as follows:

$$s=\sqrt{x_{E4}(k)^2+y_{E4}(k)^2}.$$

B2) If the following AND logic operation is satisfied:

$$\left(\cos\left(-\frac{\varphi}{2}\right) \cdot x_{E4}(k) + \sin\left(-\frac{\varphi}{2}\right) \cdot y_{E4}(k) \geq 0\right) \text{ AND}$$

$$\left(\cos\left(-\frac{\varphi}{2}\right) \cdot x_{E3}(k) + \sin\left(-\frac{\varphi}{2}\right) \cdot y_{E3}(k) \leq 0\right),$$

which means that the corner E3 is located within the sensing range of the sensor SR1, then the distance s is calculated as follows:

$$s = \frac{\mu_2(k)}{\sin\left(-\frac{\varphi}{2} - x_5(k)\right)}.$$

B3) If neither the corner E3 nor E4 is within the sensing range of the sensor SR1 under the condition $\mu_2(k)>0$, the following applies:

$$s=s_{max}.$$

C(k): This relates to the case in which the object O completely covers the sensing range W of the sensor SR1, as is the case in the example of FIG. 2c. The distance s between the object and the ego vehicle E is then calculated as follows:

$$s = \cos\left(x_5(k) + \frac{\pi}{2}\right) \cdot x(k) + \sin\left(x_5(k) + \frac{\pi}{2}\right) \cdot y(k) - \theta_2(k) \qquad \text{C1)}$$

The modeled distance value of an ultrasonic sensor, in this example the sensor SR1, then results as follows:

$$\hat{y}_{SR1}(k)=\min(s,s_{max})$$

The distinctions described above under A(k), B(k) and C(k) are repeated for each ultrasonic sensor i=1 to m considered in the model, m being the number of sensors involved. In the example of FIG. 3, these are the sensors SR1 and SR2.

The total output of the complete model is then composed of the individual estimated sensor values as follows:

$\hat{y} = [\hat{y}_1(k), \hat{y}_2(k), \ldots, \hat{y}_m(k)]^T$ with 1, ..., m number of sensors In the example of FIG. 3, the sensors SR1 and SR2 are relevant, and therefore the modeled distance vector for the two sensors SR1, SR2 is:

$\hat{y} = [\hat{y}_{SR1}(k), \hat{y}_{SR2}(k)]^T$.

By applying a suitable optimization method, for example the predictive error method, a sliding mode observer, the Kalman filter, the Levenberg-Marquardt method, etc., the state vector $\vec{x}$ and the parameter vector $\theta$ are adapted such that the measured y(k) and the modeled ŷ(k) system output match as well as possible within the meaning of a defined optimization criterion.

A typical optimization criterion is the minimization of the sum of the deviations F(N) between the measured and the modeled system output, i.e.

$F(N) = \Sigma_{k=1}^{N}(y(k) - \hat{y}(k))^2$, with N=number of measurements.

This is not the only option for minimizing the deviations. Instead of squaring the difference, the amount of the difference between the measured and the modeled system output can be used, for example.

Figure 4:
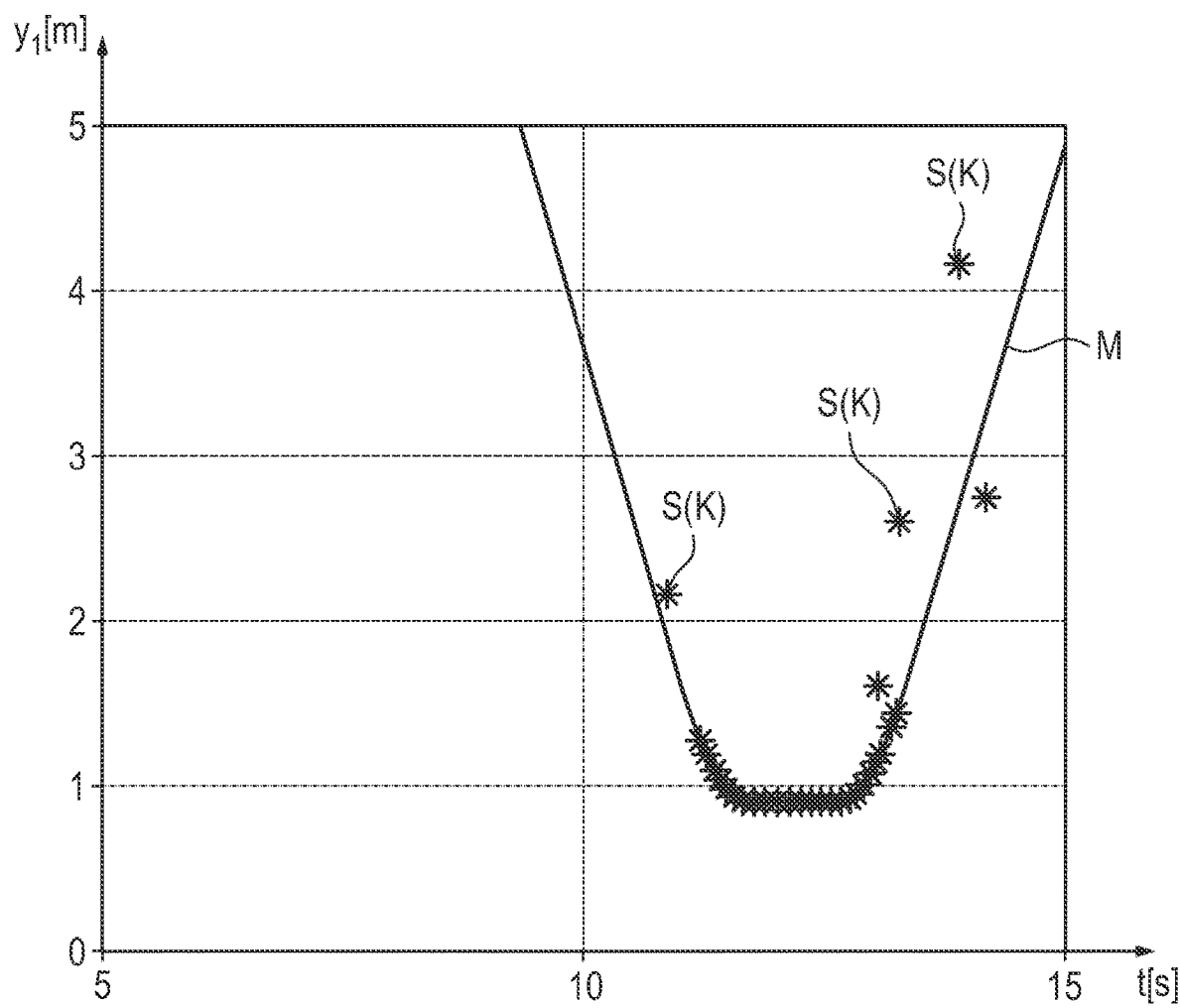
FIG. 4 shows an example of distance sensing in the case of an object moving parallel to the ego vehicle.

FIG. 4 shows the result of the modeling for the case of parallel passing for the sensor SR1. The ego vehicle E is therefore overtaken by an object vehicle O that passes by in parallel. The measurements s(k) of the sensor SR1 are shown as a function of the time t in the form of stars "✳", wherein the measurement index k can also be understood as the point in time t. There is therefore a clear assignment of the number k of the measurement to the point in time t. The model M, i.e., the modeled system output ŷ(k), is shown as a solid line.

Therefore, the state vector $\vec{x}$ described at the outset and the parameter vector $\theta$ are determined by means of the above-mentioned minimization of the sum of the deviations.

Figure 5:
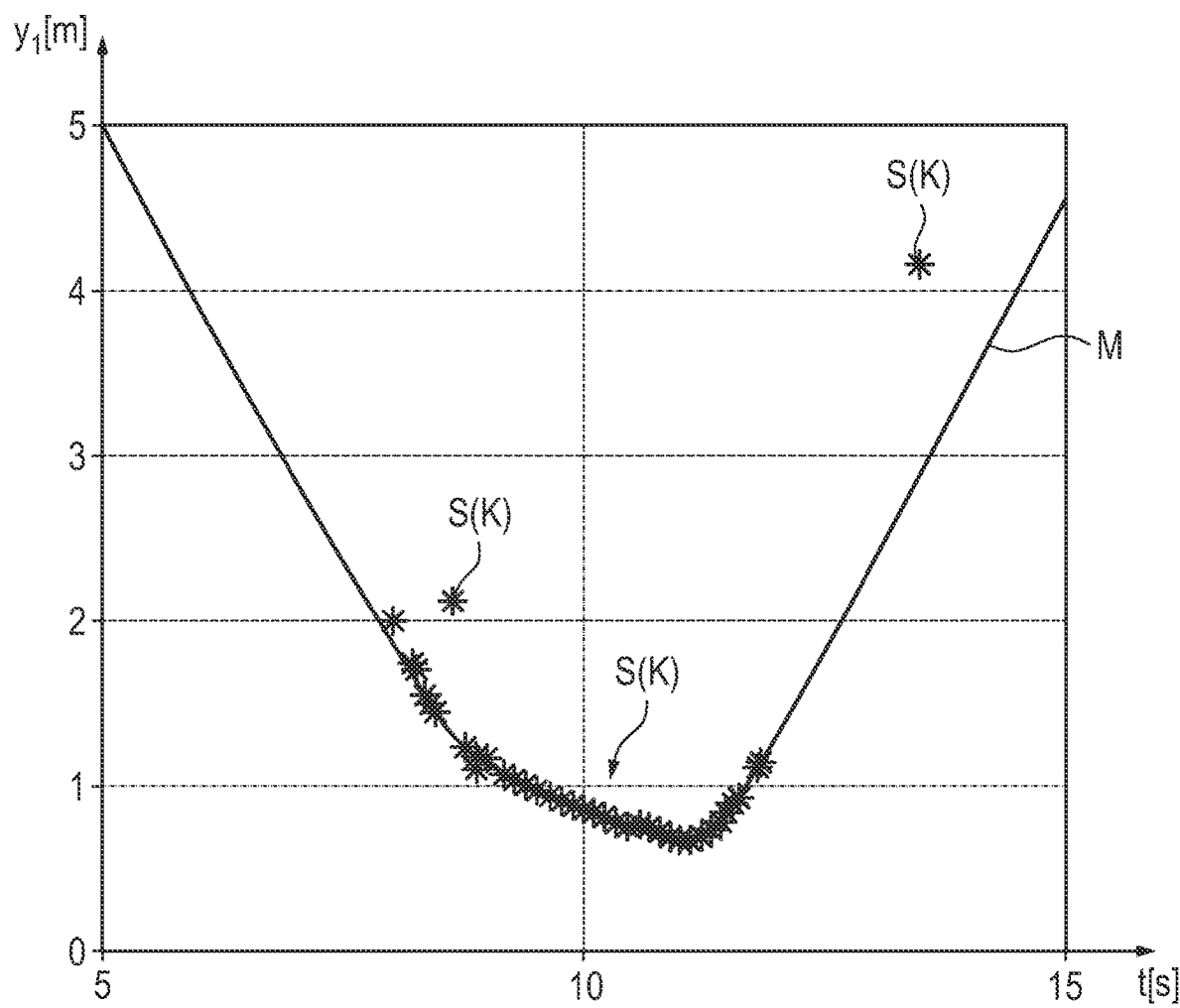
FIG. 5 shows an example of distance sensing in the case of an object moving obliquely to the ego vehicle.

FIG. 5 shows the result of the modeling for the case of oblique passing, i.e., the ego vehicle E is overtaken by an object vehicle that is passing by at an angle, wherein only one sensor SR1 is considered here as well. The measurements s(k) of the sensor SR1 are shown as a function of the time t in the form of stars "✳", wherein the measurement index k can also be understood as the point in time t. There is therefore a clear assignment of the number k of the measurement to the point in time t. The model M, i.e., the modeled system output ŷ(k), is shown as a solid line that extends obliquely in the lower region, unlike in the case of FIG. 4.

The state vector $\vec{x}$ described at the outset and the parameter vector $\theta$ can therefore be determined from the model M.

In the case of the described modeling of the distance sensing, the present situation A(k), B(K) or C(k) is checked using IF-THEN queries. Instead of this sequence of requests, in another embodiment, specially parameterized activation functions can also be used. This will be explained in the following based on the example of the check as to whether the object is located to the left or right of or on the straight line a.

The three cases A(k) to C(k) already explained above are distinguished.

A(k) $\mu_1 < 0$

Here, the case with $\mu_1(k) < 0$ is therefore relevant and is reproduced in FIGS. 2a and 2b. The object O is located to the left of the straight line a, which extends through the origin of the coordinate system of the sensor SR1 and which is perpendicular to the longitudinal axis LO of the object, as already defined above. The straight line a forms, so to speak, a normal on the longitudinal axis of the object O, which extends through the origin of the sensor SR1.

For this first case with $\mu_1(k) < 0$, in which the object O is located to the left of the straight line a, the following transition function $f_1(k)$ is defined:

$$f_1(k) = \left(-0.5 \frac{\beta \cdot \mu_1(k)}{\sqrt{(\beta \cdot \mu_1(k))^2}} + 1\right).$$

Here, the factor $\beta$ is a constant parameter that defines the steepness of the transition from the value "One" to the value "Zero" or, alternatively, from the value "Zero" to the value "One".

Using the above transition function $f_1(k)$, an activation function $\delta_1(k)$ for the case $\mu_1(k) < 0$ is defined as follows:

$\delta_1(k) = (f_1(k) - 0.5)$.

Figure 6:
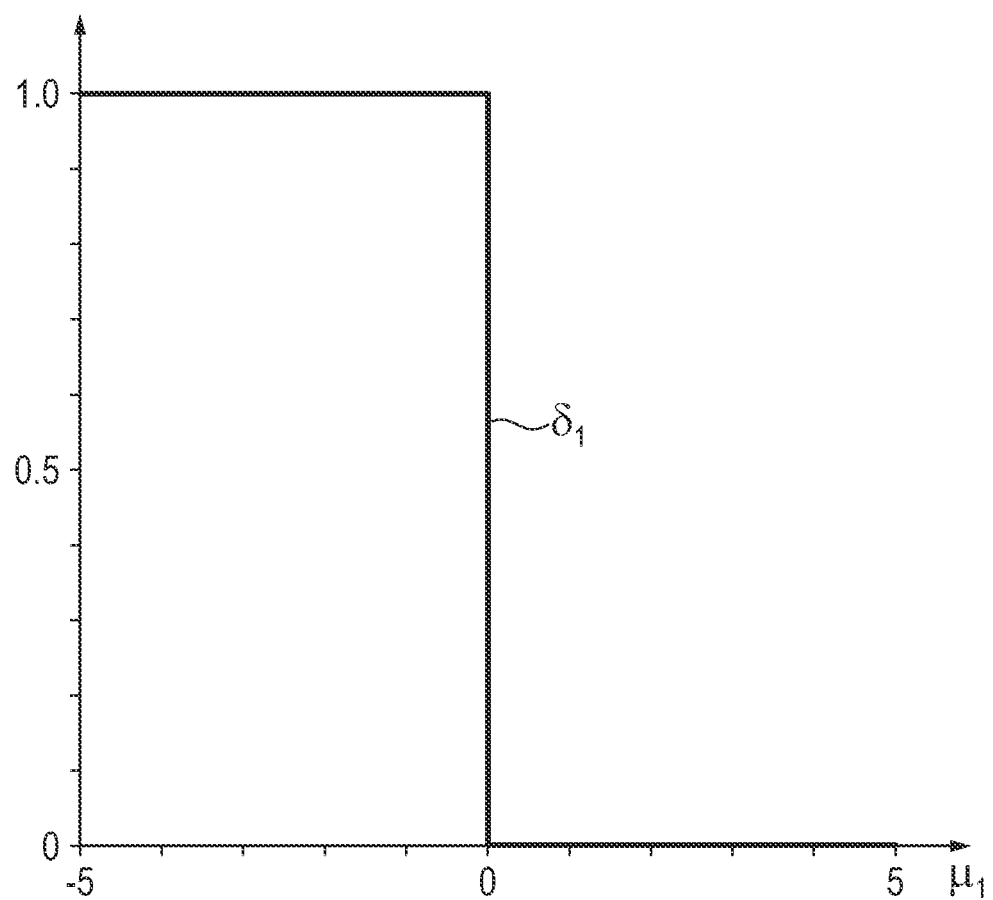
FIG. 6 shows the course of the activation function $\delta_1(k)$.

This first activation function $\delta_1(k)$ is shown in FIG. 6.

B(k) $\mu_2(k) > 0$

The case $\mu_2(k) > 0$ will now be considered, which means that the object O is located to the right of the straight line a shown in FIG. 3. This case is almost a mirror image of the first case shown in FIGS. 2a and 2b.

For the second case with $\mu_2(k) > 0$, in which the object O is located to the right of the straight line a, the following transition function $f_2(k)$ is defined:

$$f_2(k) = \left(0.5 \frac{\beta \cdot \mu_2(k)}{\sqrt{(\beta \cdot \mu_2(k))^2}} + 1\right).$$

Here, the factor $\beta$ is defined as above and defines the steepness of the transition from "Zero" to "One" or vice versa.

Using the above transition function $f_2(k)$, a further activation function $\delta_2(k)$ for the case $\mu_2(k) > 0$ is defined as follows:

$\delta_2(k) = (f_2(k) - 0.5)$.

Figure 7:
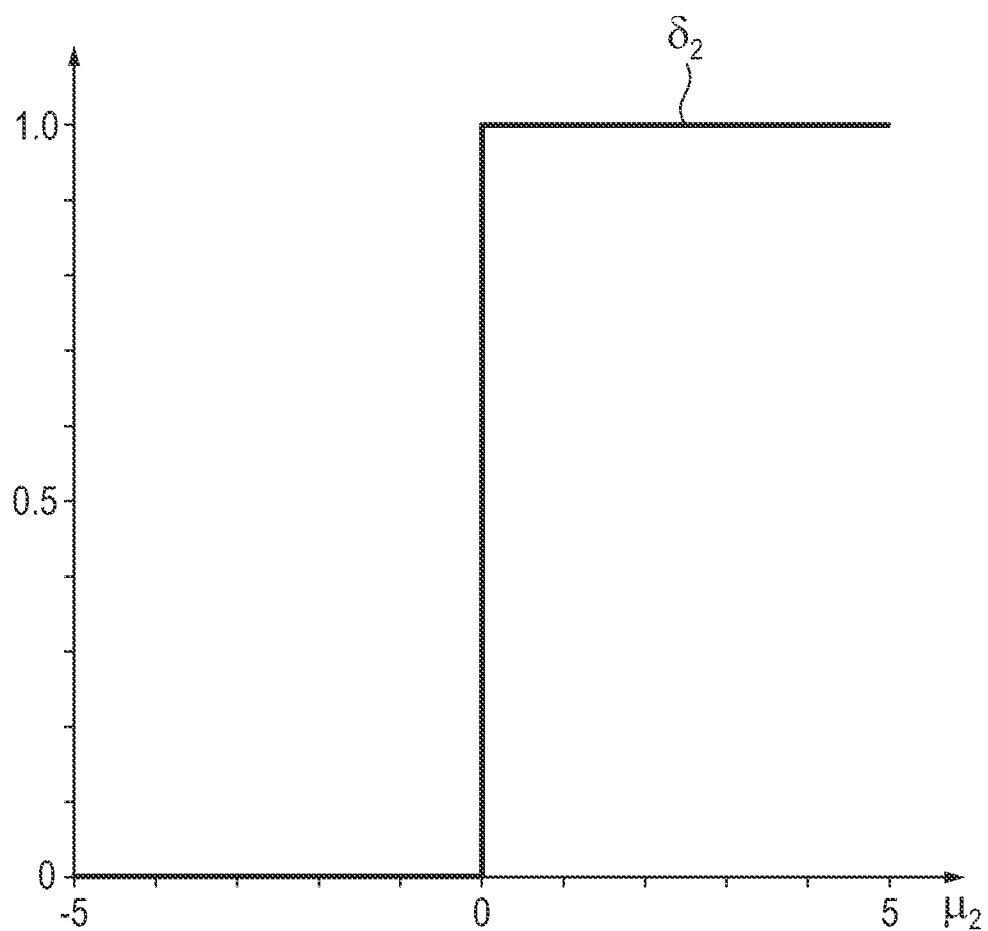
FIG. 7 shows the course of the activation function $\delta_2(k)$.

The course of this second activation function is shown in FIG. 7.

C(k)) Else

Thirdly, the case is considered in which the object O completely covers the sensing range W of the sensor SR1, i.e., is located on the straight line a, as is the case in the example of FIG. 2c.

In this case, a third activation function $\delta_3(k)$ is defined as follows:

$\delta_3(k) = (f_1(k) - 1.5) \cdot (f_2(k) - 1.5)$

This third activation function $\delta_3(k)$ then only assumes the value of "One" if $\mu_1(k) < 0$ and $\mu_2(k) > 0$ apply at the same time.

By means of the activation functions $\delta_1(k)$, $\delta_2(k)$ and $\delta_3(k)$, the query of the cases as to whether the object O is located to the left of the straight line a, to the right of the straight line a, or on the straight line a, can be represented compactly as follows:

$$s = \delta_1(k) \cdot A(k) + \delta_2(k) \cdot B(k) + \delta_3(k) \cdot C(k)$$

In order to be able to calculate the above equation, the cases or functions A(k) to C(k) must be defined. This will be shown below based on the example of the function A(k). The functions B(k) and C(k) then result in a similar manner:

Firstly, the expressions within the "IF-THEN" queries in the case A(k) are summarized as follows:

$$\rho_1 = \cos\frac{\varphi}{2} \cdot x_{E1}(k) + \sin\frac{\varphi}{2} \cdot y_{E1}(k)$$

$$\rho_2 = \cos\frac{\varphi}{2} \cdot x_{E2}(k) + \sin\frac{\varphi}{2} \cdot y_{E2}(k)$$

Figure 8:
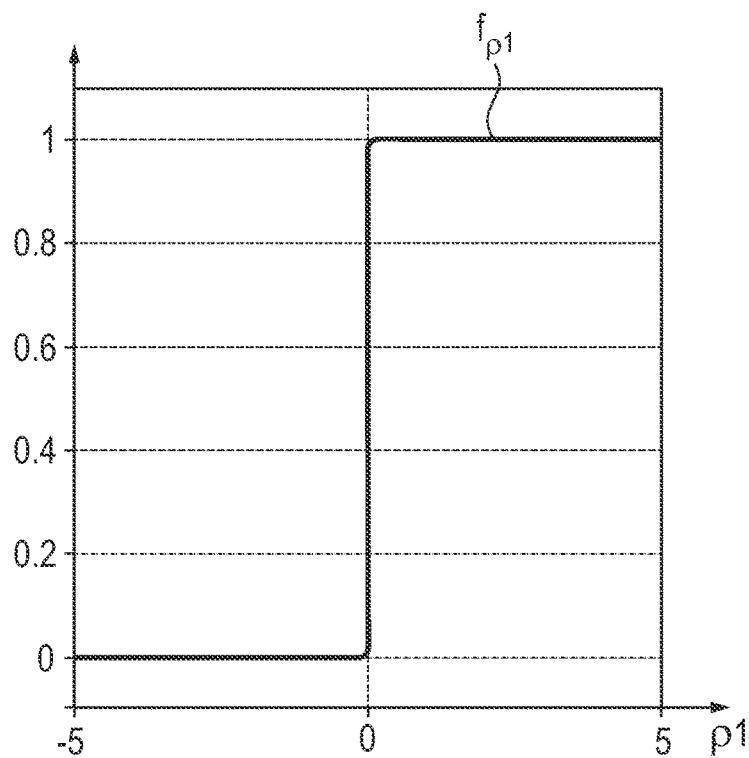
FIG. 8 shows the course of the activation function $f_{\rho_1}(k)$.
Figure 9:
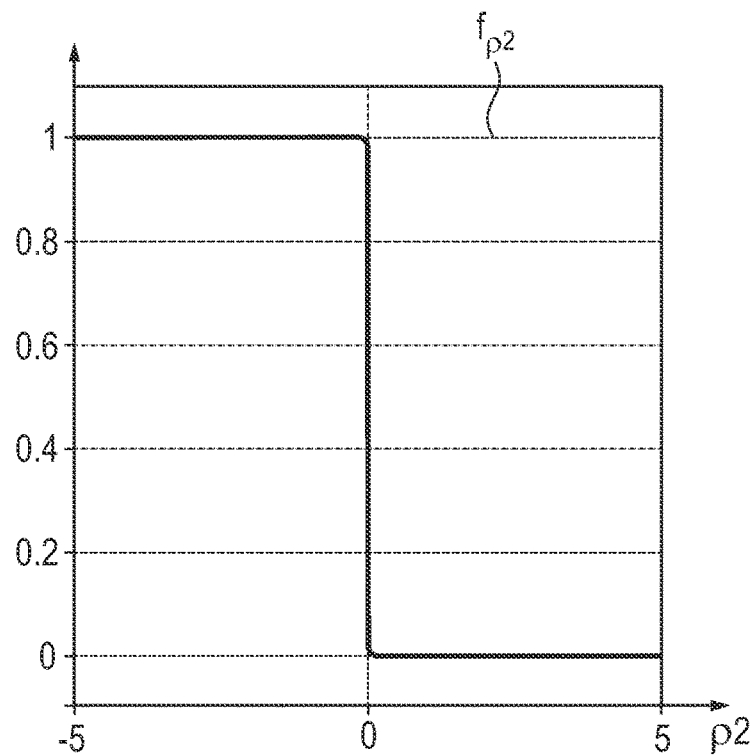
FIG. 9 shows the course of the activation function $f_{\rho_2}(k)$.
Figure 10:
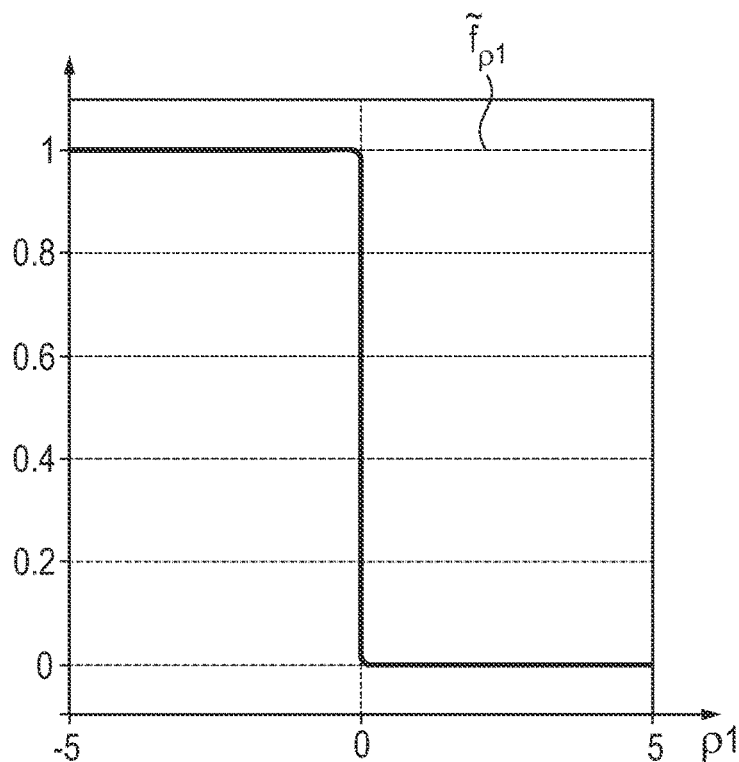
FIG. 10 shows the course of the activation function $\tilde{f}_{\rho_1}(k)$.
Figure 11:
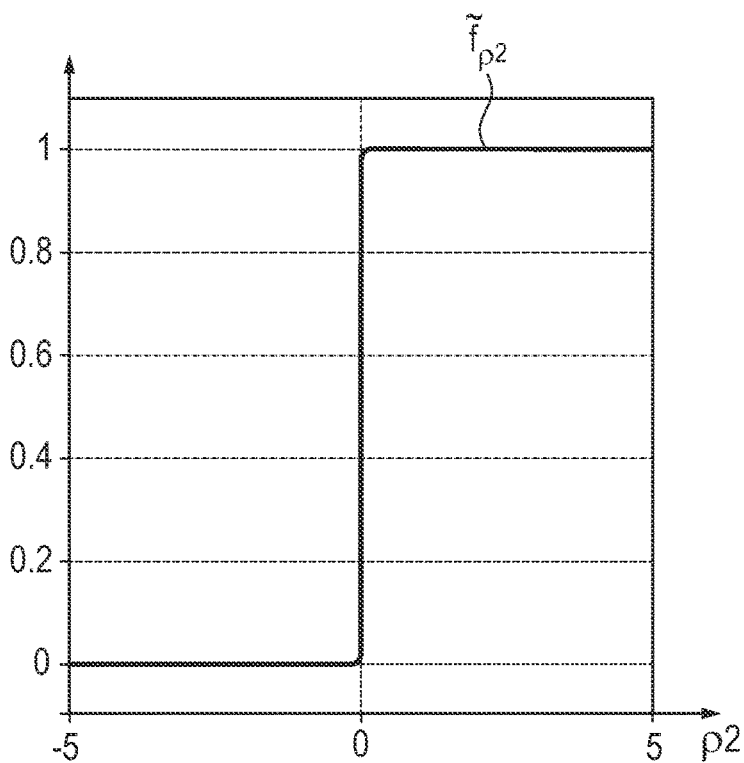
FIG. 11 shows the course of the activation function $\tilde{f}_{\rho_2}(k)$.

Further activation functions, which are shown in FIGS. 6 to 9, are defined by means of the above-described functions $\rho_1$ and $\rho_2$.

$$f_{\rho_1}(k) = 0.5 \frac{\beta \cdot \rho_1(k)}{\sqrt{(\beta \cdot \rho_1(k))^2 + 1}} + 0.5,$$ FIG. 8

$$f_{\rho_2}(k) = -0.5 \frac{\beta \cdot \rho_2(k)}{\sqrt{(\beta \cdot \rho_2(k))^2 + 1}} + 0.5,$$ FIG. 9 as well as their reflections on the ordinate:

$$\tilde{f}_{\rho_1}(k) = 0.5 \frac{\beta \cdot (-\rho_1(k))}{\sqrt{(\beta \cdot \rho_1(k))^2 + 1}} + 0.5, \text{ and}$$ FIG. 10

$$\tilde{f}_{\rho_2}(k) = -0.5 \frac{\beta \cdot (-\rho_2(k))}{\sqrt{(\beta \cdot \rho_2(k))^2 + 1}} + 0.5$$ FIG. 11

Furthermore, the calculation of the distances s for the subcases A1, A2 and A3 of the case A(k) are defined as follows:

$$s_{A1} = \frac{\mu_1(k)}{\sin\left(-\frac{\varphi}{2} - x_5(k)\right)},$$

$$s_{A2} = \sqrt{x_{E2}(k)^2 + y_{E2}(k)^2}, \text{ and}$$

$$s_{A3} = s_{max}.$$

If the distance s in the case A(k) is denoted by $s_A$, the following results for the calculation of said distance in the case A(k):

$$s_A = f_{\rho_1}(k) \cdot f_{\rho_2}(k) \cdot s_{A1} + \tilde{f}_{\rho_2}(k) \cdot s_{A2} + \tilde{f}_{\rho_1}(k) \cdot f_{\rho_2}(k) \cdot s_{A3}$$

Consequently, the equation for the general determination of the distance s:

$$s = \delta_1(k) \cdot A(k) + \delta_2(k) \cdot B(k) + \delta_3(k) \cdot C(k)$$

can be rewritten as:

$$s = \delta_1(k) \cdot f_{\rho_1}(k) \cdot f_{\rho_2}(k) \cdot s_{A1} + \tilde{f}_{\rho_2}(k) \cdot s_{A2} + \tilde{f}_{\rho_1}(k) \cdot f_{\rho_2}(k) \cdot s_{A3}) + \delta_2 B(k) + \delta_3 \cdot C(k)$$

The further cases B(k) and C(k) can be represented in a similar manner. The final value of the modeled distance value of an ultrasonic sensor then results as:

$$\hat{y}(k) = \min(s, s_{max}),$$

as is also shown in the above in conjunction with the IF-THEN queries.

LIST OF REFERENCE NUMERALS

O Object
E Ego vehicle
$\vec{r}$ Position $\vec{r} = [x, y]^T$
$\vec{v}$ Speed $v = [v_x, v_y]_T$
l Length of the object O
$\propto$ Angle between the longitudinal axes of the object and of the ego vehicle
1 Roadway
2 Lane
3 Lane
S Sensor
s1 Measured distance
s2 Measured distance
s3 Measured distance
W Sensing range
$x_e, y_e$ Coordinate system of the ego vehicle
$x_s, y_s$ Coordinate system of the sensor SR1
$x_0, y_0$ Coordinate system of the object
SR1 Sensor 1 of the ego vehicle
SR2 Sensor 2 of the ego vehicle
$x_{ob}$ Distance between center point of object and sensor SR1 in $x_s$ direction
$y_{ob}$ Distance between center point of object and sensor SR1 in $y_s$ direction
E1 Front left corner of the object
E2 Front right corner of the object
E3 Back left corner of the object
E4 Back right corner of the object
E1E2 Front edge of the object
E3E4 Back edge of the object
b Width of the object
$\mu_1$ Distance of the front edge E1-E2 of the object from the sensor SR1
$\mu_2$ Distance of the back edge E3-E4 of the object from the sensor SR1
a Sensor normal of the sensor SR1 on the longitudinal axis of the object
$\varphi$ Opening angle of the sensor SR1
LO Longitudinal axis of object
M Model for the sensor SR1
s(t) Measured distance at the point in time t
$\delta_1$ Activation function
$\delta_2$ Activation function
$\rho_1$ Query function
$\rho_2$ Query function
$f_{\rho_1}$ Activation function
$f_{\rho_2}$ Activation function
$\tilde{f}_{\rho_1}$ Activation function
$\tilde{f}_{\rho_2}$ Activation function The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification"

and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining relevant variables of an object in the environment of a motor vehicle using at least one ultrasonic sensor disposed laterally on the motor vehicle, wherein the ultrasonic sensor has a sensing range defined by a sensor-specific opening angle, comprising:
acquiring a measurement series of real sensor values for the at least one ultrasonic sensor, which sensor values represent the shortest distance between the object and the motor vehicle, wherein the sensor values of the at least one ultrasonic sensor are acquired cyclically with a specified time interval;
modeling a series of sensor values for the at least one ultrasonic sensor by:
modeling the object movement using a state vector $\vec{x}$ and a parameter vector θ, wherein the state vector $\vec{x}$ and the parameter vector θ are calculated from the relevant object variables, and
modeling the distance sensing in accordance with the state vector $\vec{x}$ and the parameter vector; θ and
determining the state vector $\vec{x}$ and the parameter vector θ by adapting the modeled sensor values to the measured real sensor values of the at least one ultrasonic sensor using an optimization method.

2. The method of claim 1, wherein the sum of the differences between the modeled sensor values and the real sensor values is minimized in order to determine the state vector and parameter vector.

3. The method of claim 2, wherein a modeled sensor value vector is formed from the modeled distance values of the at least one ultrasonic sensor, which modeled sensor value vector is linked to the sensor value vector of the real sensor values of the individual ultrasonic vectors for minimization.

4. The method of claim 1, wherein the modeled sensor values are a function of the position of the object relative to the ego vehicle and a function of the appearance of corners of the object within the sensing range of the at least one ultrasonic sensor, wherein the coordinates of the corners of the object are determined in the coordinate system of the motor vehicle.

5. The method of claim 1 wherein the relevant variables of the object are given at least by one or more of:
the longitudinal distance of the object from the motor vehicle;
the longitudinal speed of the object relative to the motor vehicle;
the lateral distance of the object from the motor vehicle;
the lateral speed of the object relative to the motor vehicle;
the angle between the longitudinal axis of the object and the longitudinal axis of the motor vehicle;
the length of the object; and
the width of the object.

6. The method of claim 3, wherein the modeled sensor value vector is formed from the modeled distance values of the at least one ultrasonic sensor, wherein the modeled distance value of the at least one ultrasonic sensor results from the minimum of the maximum range of the at least one ultrasonic sensor and calculated distance values between the object and the motor vehicle.

7. The method of claim 6, wherein the calculated distance values are determined as a function of the position of the object relative to the sensor normal of the at least one ultrasonic sensor of the motor vehicle, wherein the sensor normal is defined as the straight line that extends through the origin of the respective at least one ultrasonic sensor and that stands perpendicularly on the object longitudinal axis.

8. The method of claim 7, wherein, in order to determine the calculated distance values, it is determined whether the object is located to the left or right of or on the sensor normal.

9. The method of claim 8, wherein the determination of the position of the object is carried out using activation functions.

10. A device for determining relevant variables of an object in the environment of a motor vehicle, comprising:
at least one ultrasonic sensor disposed laterally on the motor vehicle for cyclically determining sensor values that represent distances from an object;
an apparatus for determining modeled sensor values as a function of relevant variables of the object; and
an optimization apparatus for adapting the modeled sensor values to the real sensor values for each ultrasonic sensor for acquiring the relevant object variables; wherein
the device is configured to:
acquiring a measurement series of real sensor values for the at least one ultrasonic sensor, which sensor values represent the shortest distance between the object and the motor vehicle, wherein the sensor values of the at least one ultrasonic sensor are acquired cyclically with a specified time interval;
model a series of sensor values for the at least one ultrasonic sensor by:
modeling the object movement using a state vector $\vec{x}$ and a parameter vector θ, wherein the state vector $\vec{x}$ and the parameter vector θ are calculated from the relevant object variables, and
modeling the distance sensing in accordance with the state vector $\vec{x}$ and the parameter vector; θ and
determining the state vector $\vec{x}$ and the parameter vector θ by adapting the modeled sensor values to the measured real sensor values; of the at least one ultrasonic sensor using an optimization method.

11. The method of claim 2, wherein the modeled sensor values are a function of the position of the object relative to the ego vehicle and a function of the appearance of corners of the object within the sensing range of the at least one ultrasonic sensor, wherein the coordinates of the corners of the object are determined in the coordinate system of the motor vehicle.

12. The method of claim 3, wherein the modeled sensor values are a function of the position of the object relative to the ego vehicle and a function of the appearance of corners of the object within the sensing range of the at least one ultrasonic sensor, wherein the coordinates of the corners of the object are determined in the coordinate system of the motor vehicle.

13. The method of claim 2, wherein the relevant variables of the object are given at least by one or more of:

the longitudinal distance of the object from the motor vehicle;
the longitudinal speed of the object relative to the motor vehicle;
the lateral distance of the object from the motor vehicle;
the lateral speed of the object relative to the motor vehicle;
the angle between the longitudinal axis of the object and the longitudinal axis of the motor vehicle;
the length of the object; and
the width of the object.

14. The method of claim 3, wherein the relevant variables of the object are given at least by one or more of:
the longitudinal distance of the object from the motor vehicle;
the longitudinal speed of the object relative to the motor vehicle;
the lateral distance of the object from the motor vehicle;
the lateral speed of the object relative to the motor vehicle;
the angle between the longitudinal axis of the object and the longitudinal axis of the motor vehicle;
the length of the object; and
the width of the object.

15. The method of claim 4, wherein the relevant variables of the object are given at least by one or more of:
the longitudinal distance of the object from the motor vehicle;
the longitudinal speed of the object relative to the motor vehicle;
the lateral distance of the object from the motor vehicle;
the lateral speed of the object relative to the motor vehicle;
the angle between the longitudinal axis of the object and the longitudinal axis of the motor vehicle;
the length of the object; and
the width of the object.

16. The method of claim 4, wherein the modeled sensor value vector is formed from the modeled distance values of the at least one ultrasonic sensor, wherein the modeled distance value of the at least one ultrasonic sensor results from the minimum of the maximum range of the at least one ultrasonic sensor and calculated distance values between the object and the motor vehicle.

17. The method of claim 5, wherein the modeled sensor value vector is formed from the modeled distance values of the at least one ultrasonic sensor, wherein the modeled distance value of the at least one ultrasonic sensor results from the minimum of the maximum range of the at least one ultrasonic sensor and calculated distance values between the object and the motor vehicle.

* * * * *